TEMPERATURE-STABILIZED VOLTAGE-SENSITIVE
BISTABLE CONTROL CIRCUIT
Filed March 22, 1965

INVENTORS
DONALD W. HALFHILL,
PAUL L. REMY
BY [signature]

United States Patent Office 3,341,747

Patented Sept. 12, 1967

3,341,747

TEMPERATURE-STABILIZED VOLTAGE-SENSITIVE BISTABLE CONTROL CIRCUIT

Donald W. Halfhill, Riverside, and Paul L. Remy, Beaumont, Calif., assignors to Bourns, Inc., a corporation Filed Mar. 22, 1965, Ser. No. 441,568

8 Claims. (Cl. 317—148.5)

ABSTRACT OF THE DISCLOSURE

Voltage-level sensitive bistable control circuit adapted to provide an output signal in response to triggering to a first of two stable states incident to increase of input signal potential slightly above a prescribed value, and to cut off the output signal in response to triggering from the first to a second of the two stable states incident to decrease of the input signal slightly below the prescribed triggering value; means being provided whereby the triggering potential value may be pre-set to a prescribed potential within a wide potential range, and whereby effects of temperature changes and power-source potential fluctuations are grossly minimized.

Figure 1:
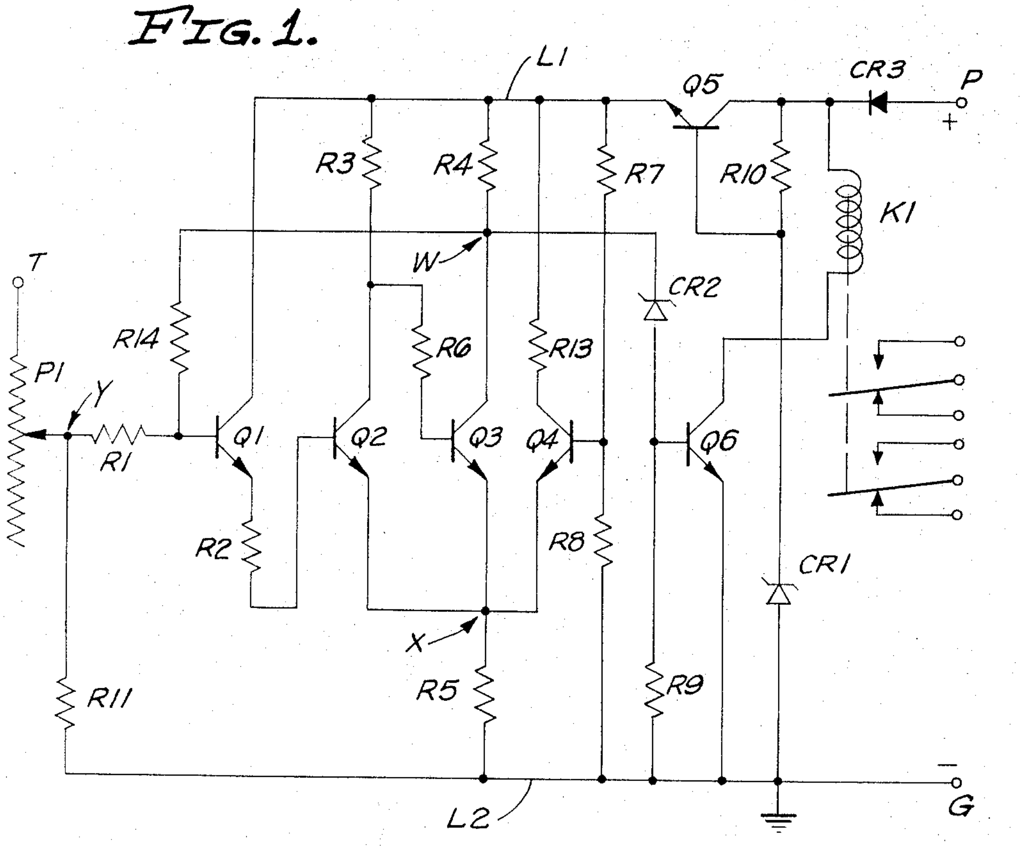

The invention hereinafter described pertains to electrical control circuits, and more particularly to bistable triggering circuits such as may be utilized to control the pickup and fall-out of relays incident to small change of the potential exhibited on an input signal line.

In the prior art it is known that controlling circuits can be provided that are effective to cause energization of a circuit or device when an input signal voltage exceeds a prescribed value and effective to cause deenergization of the circuit or device when thereafter the signal voltage drops below a lower prescribed value. It is desirable that the voltages at which energization and deenergization are initiated be as close to the same fixed but adjustable value as possible, with certainty of the action occurring and without rapid changing or "chattering" of the circuit. Also, it is desirable that the control circuit be as insensitive as is practicable to extraneous influences, such as temperature changes in the ambient, and changes of power-source voltage.

The present invention provides a control circuit that is especially adapted for controlling energization and fall-out of a relay or other controlled device and that is remarkably sensitive to input signal or "trigger" voltage but is also remarkably insensitive to changes of temperature of the ambient, that is, has built-in correctives or compensation for normally-produced errors caused by changes of active-element characteristics, etc., with change of temperature. Basically, the invention utilizes a bistable high gain amplifier circuit in the form of a modified Schmitt trigger circuit which is triggered to the "on" state when the input signal voltage rises above a predetermined value, and is triggered off when the signal voltage drops below the predetermined voltage. The invention provides means whereby the input signal voltage level at which triggering occurs may be varied. Further, impedance means are provided to raise the triggering potential level above ground potential level by a desired and preferably considerable amount, and the impedance means are made to be dynamic whereby the variation of characteristics of the amplifier elements with change of temperature are compensated. An amplifier-regulating feedback circuit is provided to make the amplifier operation stable and precise; and an input-power regulating means is provided whereby the voltage supplied for operation of the control circuit is kept constant within appropriate limits. The relationship of the voltage-regulating circuit means and the dynamic impedance means to the active elements of the amplifier is such that effects of temperature-variations on the active solid-state circuit components are almost completely compensated and operations of the circuit are stabilized over a wide range of ambient temperature. Thus the voltage-level-sensitive means of the invention is made to be adjustable, insensitive to temperature variations, and is stable despite establishment of a difference between pickup and fall-out input signal or controlling potential of only a small fraction of a millivolt.

The preceding brief general description of the invention makes it evident that it is a broad object of the invention to provide improvements in voltage-level sensitive control circuits.

Another object of the invention is to provide a voltage-level sensing control circuit that is substantially immune to wide variations in ambient temperature.

Another object of the invention is to provide biasing means for a solid-state high-gain bistable amplifier circuit which biasing means has a low A.C. impedance and a high D.C. impedance, with means providing correction of temperature-variation effects in the solid-state components.

Other objects of the invention, and advantages thereof, will be hereinafter stated or be made evident in the appended claims and following description of a preferred exemplary physical circuit according to the invention, the circuit herein being shown as having its output applied to control pull-up and fall-out of a relay. The circuit is diagrammatically illustrated in the accompanying drawings forming a part of this specification. In the drawings:

FIGURE 1 is a schematic circuit diagram, showing power means and a high-gain bistable amplifier circuit energized therefrom and comprising transistors Q2 and Q3 connected as a modified Schmitt trigger circuit with an input-potential pre-amplifier stage coupled thereto and linked to an input signal line through a variable impedance, and associated circuit means for modifying the operational characteristics of the trigger circuit, the diagram also depicting associated regulating means and an output circuit control connection to the magnet coil of an electromagnetic relay.

Figure 2:
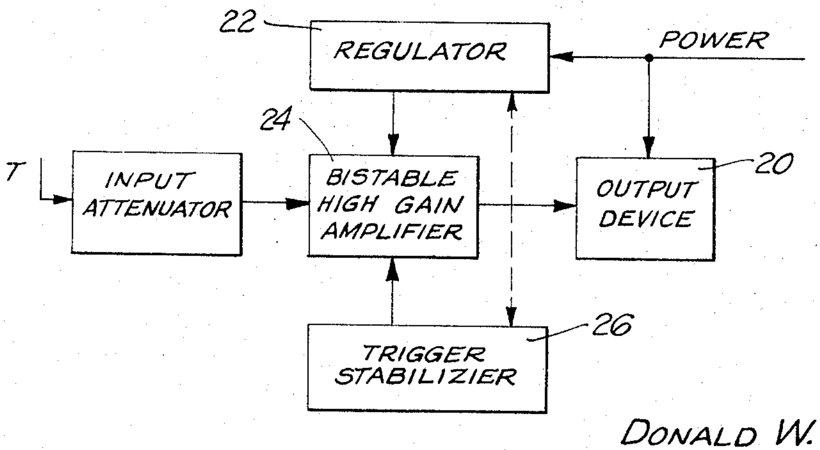

FIGURE 2 is a functional block diagram useful in explaining the functional interactions of components of the circuit.

Referring to the drawings, power for operating the control circuit and the magnet of the relay is supplied from a source such as a power supply or mains (not shown) to terminals P(+) and G(−). Proper polarity of power supplied to the control circuit, or protection against application of improper polarity, is assured by connection in the supply line from terminal P of a rectifier CR3. Solid-state means to regulate the potential supplied to the voltage-sensitive circuitry include a transistor Q5, the base bias for which is supplied by the potential drop across a resistor R10, through which current flows when the potential between P and G exceeds the breakdown potential of an appropriately selected Zener diode CR1. Thus as the potential between P and G increases, Zener diode, CR1, maintains a substantially constant base voltage on Q5. According to well-known transistor characteristics, the emitter of Q5 will be maintained at a potential slightly negative with respect to the base. Thereby, the potential between supply lines L1 and L2 is maintained substantially constant. Power to operate the electromagnet of the controlled device (relay), presently to be described, does not require close regulation of potential and accordingly the magnet of the relay is connected to use power not passed by regulating transistor Q5.

It is noted that a very high-impedance input with high gain is provided for the bistable amplifier circuit by the connection of the base-emitter path of a signal amplifying transistor Q1 in series with the base-emitter path of current-amplifying transistor Q2 and resistor R1. It is desirable, in the interest of providing for accommodation of a fairly high input-signal potential, to have the potential level at the emitters of trigger circuit transistors Q2 and Q3 fairly high. Thus it is desirable that emitter-biasing resistor R5 have a high D.C. impedance. However, it is undesirable to have at R5 a high A.C. impedance. Means whereby low effective A.C. impedance and high effective D.C. impedance is provided will presently be described, such means further being such as to substantially compensate for temperature drift effects in the bistable amplifier.

The desired functional result to be accomplished by the circuit is to switch on and off a circuit in response to the input signal potential at input signal terminal T rising above and falling below a determined value. To that end, the bistable amplifier comprising as active elements transistors Q1, Q2 and Q3 acts as the input-sensitive device which assumes a first state of operation when the input signal potential rises to a value $V+\Delta V$ and switches to the second or "off" state when the signal decreases to value $V-\Delta V$, ΔV being a very small fraction of V. That portion of the circuit operates as follows, assuming first that the input signal is lower than $V+\Delta V$ and then rises to the latter or triggering value. As the input signal potential reaches value $V+\Delta V$ with Q3 conducting, the base-emitter bias on transistors Q1 and Q2 is increased to the point where conduction is initiated. As Q2 conducts, the base-emitter bias potential applied to the base of transistor Q3 via resistor R6 falls due to increasing potential drop across resistor R3, and conduction through Q3 diminishes. The latter effectively lowers the emitter bias level at the emitter of Q2, augmenting conduction through Q2. The actions are cumulative and conduction is rapidly shifted from Q3 to Q2. As conduction through Q3 and load resistor R4 falls off to zero, the potential at junction W increases substantially to that line L1. Increase of potential at W increases the + bias on the base of output amplifying transistor Q6 to the point where the latter is fully conductive; and, further, has the effect of slightly increasing the + input potential applied to the base of Q1, via high-resistance resistor R14. The latter effect serves to lock the bistable circuit in the on state, maintaining transistor Q6 conductive. The current passed by transistor Q6 is the output or controlling signal produced by the circuit, and as herein applied is passed through the magnet coil of an electromagnetic relay K1 and there serves to cause pull-up of the relay.

Following triggering of the bistable amplifier to the on state as previously described, decrease of the input signal potential at T to a value $V-\Delta V$ is effective to decrease the base-emitter bias on Q1 to the point where conduction commences to decrease. Thereupon, conduction through Q2–R3 falls, the + potential bias on the base of Q3 rises, and the latter commences to conduct. The action is cumulative in the same fashion previously explained in connection with Q2, and conduction is rapidly taken over by Q3 and Q2 becomes nonconductive. Conduction by Q3 causes fall of potential at junction W, which has the effect of biasing Q6 to nonconduction and of removing the incremental lock-in signal applied from junction W via resistor R14 to the base of Q1. Thus the output or control signal of the circuit disappears and the magnet of relay K1 de-energizes and the relay falls out.

It is noted that a very high-impedance input with high gain is provided for the bistable amplifier circuit by the connection of the base-emitter path of transistor Q1 in series with the base-emitter path of transistor Q2 and resistor R1. The emitter bias level provided for the trigger circuit transistors Q2 and Q3 by the potential drop across impedance R5 is susceptible to variation; and hence changes in the amplification characteristic of Q2 and Q3 incident to change of ambient temperature may be compensated by appropriate change of the effective D.C. impedance presented to Q2 and Q3 by R5, the latter change being such as to raise the effective emitter-bias on Q2 and Q3 in response to temperature increase, and vice versa. Thus as increase of ambient temperature tends to decrease the base to emitter voltage drop through Q2 (or Q3) the back bias potential at junction X is increased so as to neutralize or cancel the effect of the decrease, whereby the effective triggering potential level at T remains substantially the same. The opposite actions or changes occur incident to decrease of ambient temperature.

To effect the noted desired change in the impedance of R5 as experienced or seen by Q2 and Q3, the potential at X is made to change in accord with the increase and decrease of conduction (amplification) by the solid-state active elements of the circuit, such as Q1, Q2, Q3, and Q5. Since as the ambient temperature increases, for example, conduction by Q5 tends to increase with a resultant slight increase in potential on line L1, the potential provided at the junction of voltage-dividing resistors R7 and R8 serially connected between lines L1 and L2 similarly tends to increase. The potential at that junction is accordingly applied to the base of a transistor Q4 connected in emitter-follower mode to pass emitter current through the emitter-biasing impedance R5. The collector of transistor Q4 is connected to line L1 by way of a current-limiting resistor R13, as shown. It is known that the potential at the emitter of a transistor thus connected tends to follow that at its base. Thus as the potential across lines L1 and L2 increases as the ambient temperature increases, the potential at junction X is made to increase, and vice versa. As is evident, the effective change thus brought about by the emitter-follower device comprising transistor Q4 may be appropriately governed by proper selection of the values of the resistors R7, R8 and R13. Further, the over-all effects of drift in characteristics with change of temperature, of all of the solid-state devices including Q1, Q2, Q3, Q4, Q5, CR1 and CR2, may be made to substantially completely compensate, whereby the circuit is substantially completely stabilized with respect to change of ambient temperature over a wide range of temperatures.

The over-all interaction or control function of the several major components or units of the voltage-sensitive control circuit are more simply diagrammed or visually presented in the block-diagram of FIGURE 2. Therein it is indicated that power is directly supplied from a power source to the output device 20 (coil of relay, for example), and to the potential regulating device 22 (Q5–R10–CR1). The regulating device supplies controlled-potential power to the bistable high-gain amplifier 24 (Q1, Q2, Q3 and resistors R2, R3, R4, R5, and R14). A trigger-circuit stabilizer 26 (R7, R8, R13, and Q4 in conjunction with R5) serves to compensate temperature-change induced effects by operating on the impedance R5 of the amplifier, and otherwise, with concurrent effects provided by the regulator, as indicated by the dotted control line.

Values of components, and designations thereof, employed in the exemplary illustrated control circuit are as tabulated in Table I. However, as is evident to those skilled in the art, other values of components, and other components, may be used, within the scope of design variations and in accord with known principles of electronic-circuit design.

*Table I*

| | |
|---|---|
| R1 | 50K ±10%. |
| R2 | 10K ±5%. |
| R3 | 3.6K ±10%. |
| R4 | 3.6K ±10%. |
| R5 | 300 ohms ±1%. |
| R6 | 10K ±5%. |
| R7 | 7.5K ±5%. |
| R8 | 2.7K ±5%. |
| R9 | 3.3K ±10%. |
| R10 | 1K ±5%. |
| R11 | 10K ±5%. |
| R14 | 1.8 MEG ±5%. |
| Q1, Q2, Q3, Q4 | T1411. |
| Q5, Q6 | 2N718. |
| CR1 | 1758, 18 v. ±5%. |
| CR2 | 1N754, 6.8 v. ±10%. |
| CR3 | 1N457. |
| K1 | 2K D.P.D.T. relay. |
| P1 | 60K potentiometer, ±20%. |

The foregoing description and explanation of a specific preferred embodiment of circuit according to the invention makes it evident that the aforementioned objects have been fully attained. In the light of the disclosure of the preferred embodiment, changes within the true spirit and scope of the invention will occur to others, and accordingly we do not desire to limit the scope of the invention to particular details, other than is required by the appended claims.

We claim:

1. A temperature-stablized voltage-sensitive bistable control circuit adapted to receive a variable-potential input signal and in response thereto assume a first stable state when the input signal potential is above a predetermined potential and to switch to the second stable state when thereafter the input signal potential decreases to a potential below said predetermined potential, and to provide an output control signal corresponding to the current state of operation of the circuit, said circuit comprising:

first means, including lines supplying regulated power;

second means, including a bistable trigger circuit connected to said lines to be energized therefrom, and means for supplying a variable potential input signal to said trigger circuit to control the state of operation thereof, said trigger circuit comprising first and second cross-connected transistors physically disposed to operate in the same environment and each subject to change of base-to-emitter voltage drop incident to change of temperature of said environment, and an output signal line connected to said trigger circuit to provide output signals corresponding to the respective states of operation of said bistable trigger circuit; and third means, connected to said first means and said second means and including semiconductor junction means responsive to said change of the ambient temperature, to variably bias said first and second transistors oppositely to the change of base-to-emitter voltage drop therein incident to such temperature change;

whereby the effects of variation of ambient temperature on said trigger circuit are substantially compensated by said third means.

2. A temperature-stabilized voltage-sensitive bistable control circuit according to claim 1, said third means comprising dynamic means including said semiconductor junction means connected to variably bias said first and second transistors, said dynamic means comprising a transistor connected in emitter-follower mode and biased by a potential derived from means included in said third means, said semiconductor junction means varying with change of ambient temperature and being connected to bias and compensate change of base-to-emitter voltage drop in said first and second transistors in response to said change of temperature.

3. A temperature-stablized voltage-sensitive bistable control circuit adapted to receive a variable-potential input signal and in response thereto assume a first stable state when the input potential exceeds a predetermined value and to assume a second stable state when the input potential is below said predetermined value and to provide an output control signal in response to assumption of one of said first and second stable stages, said circuit comprising:

first means, including power-line means comprising first and second lines for supplying power;

second means, including voltage-regulating means connected to said lines for regulating the potential difference between said lines and comprising a breakdown diode and limiting resistor connected across said power line means, said diode being subject to temperature drift, and a transistor connected to control flow of current to said lines in dependence upon the electric current passed by said diode;

third means, including an input signal line and a high impedance bistable amplifier device connected to said input signal line and connected to said first and second lines for energization therefrom, said amplifier device including first and second transistors subject to temperature drift and said device including a biasing resistor connected to provide bias for the emitters of said first and second transistors;

fourth means, including an output circuit connected to said amplifier device and responsive thereto to provide said output control signal in response to assumption of said first stable state by said amplifier device; and fifth means, including voltage-dividing means connected between said first and second lines and an emitter-follower transistor connected to said voltage dividing means to be biased thereby and connected to pass emitter current through said resistor;

whereby variation of the effective triggering level of said bistable amplifier device incident to temperature-change of the ambient thereat is substantially compensated by the change of effective emitter bias potential provided by said resistor incident to temperature drift of said emitter-follower transistor and of said voltage-regulating means incident to the said change of the ambient, whereby response of said control circuit to the potential level of said input signal remains substantially unaffected by temperature change within the operating temperature range of said transistors and diode.

4. A temperature-stabilized voltage-sensitive bistable control circuit adapted to receive an input signal and in response thereto assume a first stable state when the input signal potential exceeds a predetermined value and to assume a second stable state when the input signal potential is below said predetermined value and to provide an output control signal in response to assumption by said circuit of one of said first and second stable states, said circuit comprising:

first means, including a signal input line for input of an input potential;

second means, including power means comprising first and second power lines, for supplying potential-regulated power;

third means, including a bistable amplifier having an input and an output and comprising first and second transistors connected as a trigger circuit to be triggered by a signal on said input line and connected to said power lines to be energized from said lines;

fourth means, including an output control circuit connected to be energized by power from said power means and connected to said bistable amplifier to be energized and deenergized in response to alternate change of state of said amplifier incident to rise and fall of potential of said input potential signal; and fifth means, including circuit-stabilizing means to compensate change of input signal voltage level required to trigger said amplifier incident to change of ambient temperature, said circuit-stabilizing means comprising impedance means connected to establish a bias level for said first and second transistors and further comprising a third transistor connected to be biased by potential proportional to that between said lines and connected in emitter-follower mode to pass current through said impedance means, whereby the effective bias provided by said impedance means to said first and second transistors varies inversely with the base-to-emitter voltage drop in the said transistors of said amplifier incident to said change of temperature, to compensate the change in base-to-emitter voltage drop in said transistors.

5. A circuit according to claim 4, including a high-resistance feedback connection between the output and input of said amplifier, whereby incident to shift of said amplifier from either state to the other the input-signal potential level to the amplifier is appropriately changed to tend to lock the amplifier in the changed state.

6. A solid-state voltage-sensitive control circuit adapted to provide an output control signal in response to rise of input signal potential above a determined voltage level and to discontinue the output control signal in response to fall of the input signal potential below said voltage level, said control circuit comprising:

power supply means for providing D.C. potential, and solid-state voltage-regulating means supplied therefrom and connected to supply regulated potential to power lines of said supply means;

a bistable high-gain amplifier connected to receive voltage-regulated power from said power lines and having first and second transistors each having a respective emitter-collector circuit including a resistor serially connected in both said emitter-collector circuits, said transistors being cross-connected by a bias connection whereby one or the other of said transistors conducts but only one thereof at a time, the emitter bias potential to said transistors being determined by the potential drop across said resistor;

a potential divider connected across said power lines;

a third transistor connected in emitter-follower mode with the base thereof connected to said potential divider for base bias and the emitter thereof connected to said resistor for passage of the emitter current through said resistor;

an input signal line connected to the input of said amplifier, and an output control signal line connected to the output line of said amplifier for providing a control signal following the stable state of the amplifier;

whereby the change of emitter-to-base voltage drop in said transistors of said amplifier incident to change in ambient temperature is compensated by the change in effective emitter bias presented to said first and second transistors in said amplifier by said resistor acting in response to the concurrent temperature-induced drift of said third transistor, so that the input signal potential levels at which triggering of said amplifier occurs remain substantially constant with variations of ambient temperature.

7. A temperature-stabilized voltage-sensitive bistable control circuit and circuit means controlled thereby, said control circuit adapted to receive an input signal supplied thereto and in response to said signal assume one stable state when the potential of the input signal exceeds a determinable potential and to switch to the second stable state when the input signal potential falls below said determinable potential and to provide an output control signal in response to assumption by said circuit of one of said stable states, said circuit comprising:

a high-gain bistable amplifier device and means including power lines supplying closely regulated power to said amplifier device, said amplifier device comprising an emitter-biasing impedance and first and second transistors each having an emitter connected to one side of said power line via said emitter-biasing impedand a collector connected to the other side of said line via a respective load resistor;

a voltage-dividing circuit connected across said power lines and having a tap;

a solid state device having a base and an emitter, and means connecting the base thereof to said tap of said voltage-dividing circuit and the emitter thereof to said impedance to pass emitter current through said impedance;

potential-regulating means for said power line, including a transistor connected to control the flow of current via said lines to said amplifier and said volt-dividing circuit; and means for providing a single signal input to said amplifier, and an output signal line connected to said circuit means and connected to said amplifier to provide a control signal therefrom corresponding to the state of operation of said amplifier;

whereby temperature-change effects on said amplifier tending to change the triggering potential level thereof are compensated by change of bias supplied to said amplifier by said impedance incident to change of emitter current through the impedance from said solid state device.

8. A temperature-stabilized voltage-sensitive electromagnetic relay device adapted to receive an electrical input signal and in response thereto assume from among energized and de-energized states one of said states when the input signal potential exceeds a predetermined potential and to switch to the other of said states when the input signal potential diminishes to a potential less than said predetermined potential, said device comprising:

first means, including power means having power input means, and further including first and second power lines and means effective to derive power from said power input means and supply regulated power to said power lines;

second means, including an electromagnetic relay having an electromagnet, said relay being effective to assume said energized state when supplied electric current in substantial quantity and to assume said de-energized state when denied electric current in substantial quantity, and said second means including a solid-state switch device and connections for supplying current in substantial quantity from said power input means in response to a controlling signal;

third means, including a bistable trigger circuit device, connected to be energized from said power lines, said device comprising first and second cross-connected transistors and a common impedance to provide emitter bias for said transistors;

fourth means, including input signal means for applying input signal potential to trigger said trigger circuit oppositely in accord with input signal potential being respectively in excess of and less than said predetermined potential;

fifth means, including a transistor circuit device connected in emitter-follower mode to be powered by power from said power lines and to pass emitter current through said common impedance; and sixth means, including output signal means connecting said bistable trigger circuit to said solid-state switch means to control the latter to cause supply of current in substantial quantity to said electromagnet in response to an output signal produced by said trigger circuit in one state and to cause decrease of current supply to less than substantial quantity in response to an output signal from said trigger circuit when in said other state, said first means and said fifth means comprising solid-state current-passing devices having temperature-drift characteristics such as to compensate for change of base-to-emitter voltage drop in said first and second cross-connected transistors incident to change of ambient temperature.

whereby the potentials of said input signal at which triggering of said bistable trigger circuit occurs remain substantially constant over a wide range of ambient temperatures.

References Cited

UNITED STATES PATENTS

| | | | |
|---|---|---|---|
| 2,827,574 | 3/1958 | Schneider | 307—88.5 |
| 3,083,304 | 3/1963 | Spriestersbach et al. | 307—88.5 |
| 3,204,128 | 8/1965 | Petersen | 307—88.5 |
| 3,263,156 | 7/1966 | Isaacs | 323—9 |

MILTON O. HIRSHFIELD, *Primary Examiner.*

J. A. SILVERMAN, *Assistant Examiner.*

UNITED STATES PATENT OFFICE
CERTIFICATE OF CORRECTION

Patent No. 3,341,747 September 12, 1967

Donald W. Halfhill et al.

It is hereby certified that error appears in the above numbered patent requiring correction and that the said Letters Patent should read as corrected below.

Column 3, line 52, for "to that line" read -- to that of line --; line 57, for "to lock the" read -- to "lock" the --; line 58, for "the on state" read -- the "on" state --; line 64, for "the on" read -- the "on" --; column 4, lines 53 and 54, for "made to substantially completely compensate," read -- made substantially completely compensating, --; column 6, line 7, for "stablized" read -- stabilized --; lines 46 and 47, for "com-sated" read -- compensated --; column 8, line 9, for "imped-" read -- impedance --; line 21, for "volt-" read -- voltage- --.

Signed and sealed this 24th day of September 1968.

(SEAL)
Attest:

EDWARD M.FLETCHER,JR.
Attesting Officer

EDWARD J. BRENNER
Commissioner of Patents